Dec. 9, 1930.  F. MÖLLER  1,784,304
ELECTRICALLY OPERATED EDGE DRIVEN ROLL
Filed July 2, 1928
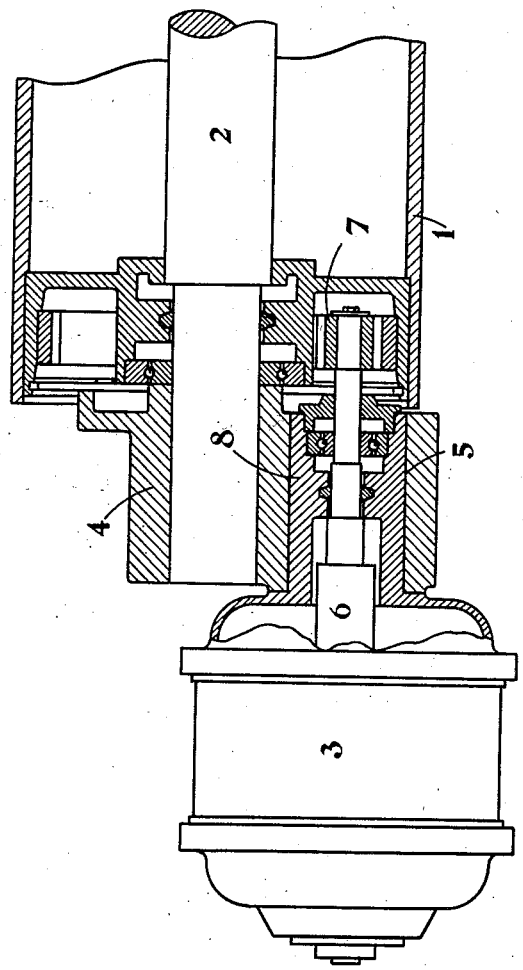
Inventor
F. Möller:
by
W. E. Evans
Attorney.

Patented Dec. 9, 1930

1,784,304

UNITED STATES PATENT OFFICE

FRITZ MÖLLER, OF DUISBURG, GERMANY, ASSIGNOR TO DEMAG AKTIENGESELLSCHAFT, OF DUISBURG, GERMANY

ELECTRICALLY-OPERATED EDGE-DRIVEN ROLL

Application filed July 2, 1928. Serial No. 289,898.

It has become the practice to provide an electrical drive separately for each roll, as used particularly in rolling-mills. It has been proposed to construct the roll itself as the rotor of a driving motor or to connect it rigidly with the rotor. Not only does this involve constructive difficulties, but it has the disadvantage that the considerable heat generated in the electrical parts leads very easily to breakdowns, consequently the earlier construction has been reverted to, viz, the motor is arranged laterally of the rolls and is connected to them by gearing.

The present invention involves the use of means for driving rolls of the last-mentioned type.

According to the invention, in the use of the known stationary roll spindle one of the axial supports at the same time serves to receive the motor shaft, which is provided at its outer end with a pinion that engages in the internal teeth of the roll. The construction may be such that the motor casing is provided with a projecting part that acts as a bearing for the motor shaft, the projecting part being fitted within the support of the roll spindle. This simplifies the work of dismantling the motor, when required, as the roll itself may remain in the operative position.

The accompanying drawing illustrates diagrammatically one construction according to the invention by way of example.

The roll is denoted 1 and the stationary spindle 2. The support 4 for the spindle 2, which is disposed adjacent the driving motor 3 is provided, below the end of the spindle 2, with a cylindrical bore 5, through which passes the motor shaft 6 carrying the pinion 7. The motor casing 3 is provided with a projecting part 8, which fits into the cylindrical bore 5 of the bearing 4. The projecting part 8 is formed a bearing for the motor shaft 6.

I claim:—

1. An electrically driven roll for rolling mills, provided with a stationary spindle, a support for the said spindle, a driving motor having a casing with an axial extension of the casing serving as bearing for the motor shaft and to extend through the said support a pinion upon the motor shaft, and internal teeth upon the roll with which said pinion engages.

2. An electrically driven roll for rolling mills, provided with a stationary spindle, a support for the said spindle having an opening parallel with the axis of the said spindle, a driving motor having a casing with an axial extension of the casing adapted to be fitted into the opening of the said support and serving as a bearing for the motor shaft, a pinion upon an extension of the motor shaft, and internal teeth upon the roll with which the said pinion engages.

3. An electrically driven roll for rolling mills, provided with a stationary spindle, a support for the said spindle, internal teeth provided on the inner periphery of the roll at the adjacent end, a driving motor carried by the said support, said motor having the shaft extended axially through the said support, and a pinion upon the said motor shaft gearing with the teeth upon the said roll.

FRITZ MÖLLER.